United States Patent
Cromer et al.

(10) Patent No.: US 6,832,262 B2
(45) Date of Patent: Dec. 14, 2004

(54) METHOD AND SYSTEM FOR DISGUISING A COMPUTER SYSTEM'S IDENTITY ON A NETWORK BY DISGUISING THE SYSTEM'S MAC ADDRESS

(75) Inventors: Daryl Carvis Cromer, Apex, NC (US); Richard Alan Dayan, Wake Forest, NC (US); Eric Richard Kern, Durham, NC (US); Randall Scott Springfield, Chapel Hill, NC (US); Joseph Wayne Freeman, Raleigh, NC (US); Robert Duane Johnson, Raleigh, NC (US); Brandon Jon Ellison, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 09/759,936

(22) Filed: Jan. 12, 2001

(65) Prior Publication Data

US 2002/0095514 A1 Jul. 18, 2002

(51) Int. Cl.⁷ ............................................. G06F 15/16
(52) U.S. Cl. ................... 709/245; 709/203; 709/221; 713/2; 713/100
(58) Field of Search ............................... 709/245, 202, 709/203, 221; 713/2, 100

(56) References Cited

U.S. PATENT DOCUMENTS

| | | | | |
|---|---|---|---|---|
| 5,919,257 A | * | 7/1999 | Trostle | 713/200 |
| 5,974,547 A | * | 10/1999 | Klimenko | 713/2 |
| 6,101,608 A | * | 8/2000 | Schmidt et al. | 713/202 |
| 6,343,330 B1 | * | 1/2002 | Khanna et al. | 709/249 |
| 6,609,151 B1 | * | 8/2003 | Khanna et al. | 709/222 |
| 6,631,137 B1 | * | 10/2003 | Lorrain et al. | 370/401 |

* cited by examiner

*Primary Examiner*—Mehmet B. Geckil
(74) *Attorney, Agent, or Firm*—Carlos Munoz-Bustamante Dillon & Yudell, LLP

(57) ABSTRACT

A method and system are disclosed for substituting an anonymous media access controller (MAC) address for a client computer system's real MAC address in order to disguise an identity of the client computer system when the client computer system is utilizing a network. The client computer system is coupled to a server computer system via the network. A primary storage device is established for storing a MAC address. A MAC address which is stored in the primary storage device is utilized as a network address for the client computer system when the client computer system is utilizing the network. An anonymous MAC address is generated. The anonymous MAC address is not associated with any particular client computer system. The anonymous MAC address is then stored in the primary storage device. The client computer system utilizes the anonymous MAC address as the network address for the client computer system when the client computer system is utilizing the network.

16 Claims, 4 Drawing Sheets

METHOD AND SYSTEM FOR DISGUISING A COMPUTER SYSTEM'S IDENTITY ON A NETWORK BY DISGUISING THE SYSTEM'S MAC ADDRESS

CROSS-REFERENCE TO RELATED APPLICATIONS

The present invention is related to the subject matter of co-pending patent application Ser. No. 09759953 entitled "METHOD AND SYSTEM FOR DISGUISING A COMPUTER SYSTEM'S IDENTITY ON A NETWORK", assigned to the assignee herein named, filed on Jan. 12, 2001, and incorporated herein by reference.

BACKGROUND OF THE INVENTION

1. Field of the Invention

The present invention relates in general to data processing systems and, in particular, to a data processing system and method for disguising a computer's identity on a network. Still more particularly, the present invention relates to a data processing system and method for disguising a computer's identity on a network by utilizing an anonymous media access controller address instead of the real media access controller address.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

A computer system requires a basic input/output system (BIOS) in order to operate. The BIOS is code that controls basic hardware operations, such as interactions with disk drives, hard drives, and the keyboard.

When a computer is reset, prior to a boot process being executed, the hardware components of the computer system are initialized. When the initialization is complete, a boot process begins when POST begins executing. POST uses the initialization settings to configure the computer. BIOS then controls the basic operation of the hardware utilizing the hardware as it was configured by POST. The boot process is complete upon the completion of the execution of the POST commands.

A network adapter card which conforms to the Ethernet specification will include a media access controller (MAC). The IEEE provides a unique MAC address for each adapter card which is manufactured. This address is an address which is unique to that card.

When a computer system accesses a network by transmitting network packets, the MAC address of the network adapter used to transmit a packet is included in the packet. It becomes very easy to track the use of the network by tracking the MAC address included in each packet.

The Internet communication protocol relies on an Internet Protocol (IP) address of the client computer system to transmit information to/from the client. The IP address can be either static across sessions or dynamic and changing with each new session. The MAC address, however, is unique for each network adapter. So, even though the client may receive a different IP address with each session, the MAC address included along with the IP address in each network packet will always be the same MAC address.

Server computer systems use the MAC address to identify a particular client computer system. Servers also associate a MAC address with either a static or dynamic IP address. Once this association between a MAC address and an IP address is made, whether statically or dynamically assigned, the MAC address is no longer required. The MAC address, however, remains available to the network. Therefore, the MAC address is always available by determining which MAC address was associated with a particular IP address.

The Internet is revolutionizing the way many people live their lives from shopping to seeking entertainment and information. However, there is a disadvantage to using the Internet. A user loses his/her privacy when the network packets are tracked. For example, a merchant could track which users are using the merchant's services by tracking the MAC address included in the packets transmitted to the merchant.

Currently, in order for a user to remain anonymous when accessing entertainment and conducting transactions, the user must conduct the transactions and access entertainment without using the Internet. For example, a user can pay for merchandise using cash. Reading a newspaper or watching broadcast television will not result in others learning what articles the user reads or program which the user watches.

Therefore a need exists for a data processing system and method for disguising an identity of a client computer system when the client is utilizing a network.

SUMMARY OF THE INVENTION

A method and system are disclosed for substituting an anonymous media access controller (MAC) address for a client computer system's real MAC address in order to disguise an identity of the client computer system when the client computer system is utilizing a network. The client computer system is coupled to a server computer system via the network. A primary storage device is established for storing a MAC address. A MAC address which is stored in the primary storage device is utilized as a network address for the client computer system when the client computer system is utilizing the network. An anonymous MAC address is generated. The anonymous MAC address is not associated with any particular client computer system. The anonymous MAC address is then stored in the primary storage device. The client computer system utilizes the anonymous MAC address as the network address for the client computer system when the client computer system is utilizing the network.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for substituting an anonymous media access controller (MAC) address for a client computer system's real MAC address in order to disguise the identity of the client computer system when the client computer system is utilizing a network. The network adapter of the client includes a media access controller and a primary storage device. The primary storage device is used for storing a MAC address. When the client computer system receives a power-on or reset condition, prior to the client starting its boot process, the hardware components of the client are initialized. When the hardware is initialized, the address stored in the primary storage device is copied from the primary storage device into the MAC to be used as the MAC address of the client.

The client also includes a backup storage device. The backup storage device is used when the identity of the client is to be disguised. When the identity of the client is to be disguised, the real MAC address stored in the primary storage location is moved from the primary storage location into the backup storage location. An anonymous MAC address is then stored in the primary storage location. The client is then reset and rebooted. In response to being reset, the hardware is again initialized. In this case, the address copied from the primary storage device will be the anonymous MAC address. Thereafter, when the client provides its MAC address, it will provide the anonymous MAC address.

When the client is to again represent its true identity, the real MAC address which is stored in the backup storage device is copied from the backup storage device back into the primary storage device. The client system is then reset.

In order to determine whether to disguise a computer system's real MAC address, a cloaking bit is used which is included in the CMOS. When the cloaking bit is set, the address stored in the primary storage device is copied to the backup storage device so that an anonymous address can be subsequently stored in the primary storage device. When the cloaking bit is cleared, the address stored in the backup storage device is restored to the primary storage device so that the real MAC address can be used.

An anonymous MAC address may be generated using one of several methods. One method requires the IEEE to supply either one standard, anonymous MAC address or a range of anonymous MAC addresses. When a range is supplied, the client computer system could dynamically select one of the addresses from the range.

Figure 1:
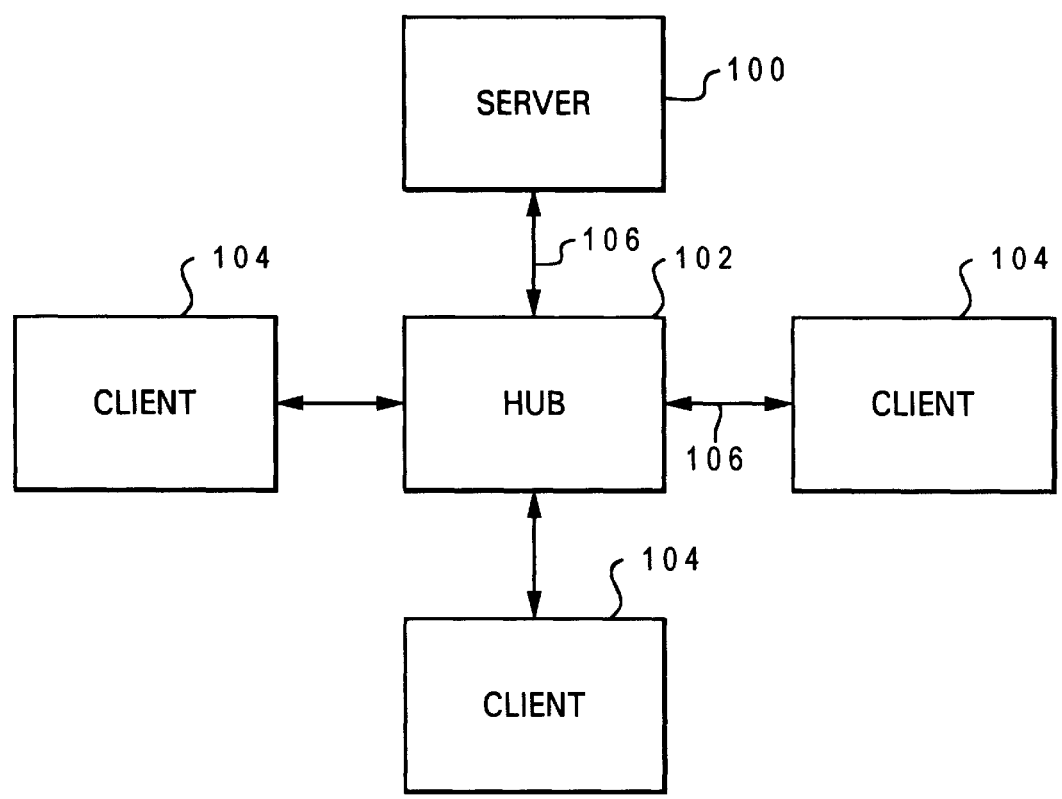
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a network including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client computer systems 104 also connect to hub 102 through respective LAN busses 106. The preferred form of the network conforms to the Ethernet specification and uses such hubs and busses. It will be appreciated, however, that other forms of networks may be utilized to implement the invention.

Figure 2:
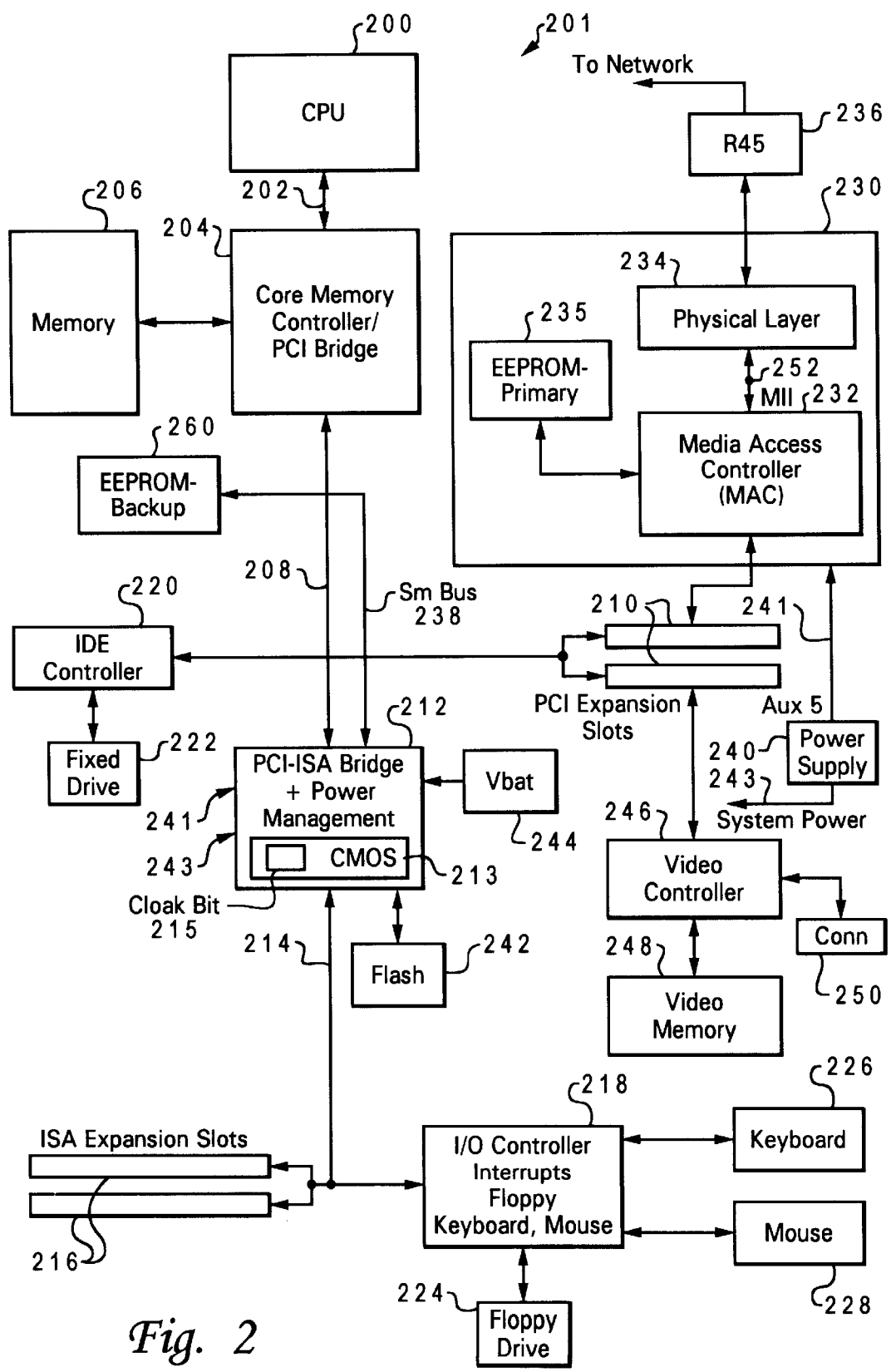
FIG. 2 depicts a more detailed pictorial representation of either a client or server computer system in accordance with the method and system of the present invention.

FIG. 2 depicts a more detailed pictorial representation of either a client or a server computer system in accordance with the method and system of the present invention. Client computer system 104 includes a planar 201 (also commonly called a motherboard or system board) which is mounted within client 104 and provides a means for mounting and electrically interconnecting various components of client 104 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A cloak bit 215 is included within CMOS 213. Cloak bit 215 is utilized to determine whether the real MAC address should be disguised. When cloak bit 215 is set, the real MAC address assigned to MAC 232 by the IEEE will be disguised. When cloak bit 215 is cleared, the real MAC address assigned to MAC 232 will be transmitted.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Client computer system 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104 through connector 250.

Computer system 104 includes a power supply 240 which supplies full normal system power 243, and has an auxiliary power main AUX 5 241 which supplies full time power to the power management logic 212 and to network adapter 230.

In accordance with the present invention, a backup storage device 260 is coupled to PCI-ISA bridge 212 utilizing a system management (SM) bus 238. System management bus 238 is a two-wire, low speed, serial bus used to interconnect management and monitoring devices. Those skilled in the art will recognize that backup storage device 260 may be coupled to another bus within planar 201.

Client 104 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

Network adapter 230 also includes a primary storage device 235 coupled to MAC 232. Preferably, device 235 is implemented utilizing an electronically erasable storage device, such as an EEPROM. At the time network adapter 230 is manufactured, the real MAC address assigned by the IEEE is stored in primary storage device 235. Subsequently, when client 104 receives a power-on or reset condition, the hardware components of planar 201 are initialized. When the hardware components are initialized, the address stored in EEPROM 235 is copied into MAC 232. When the cloaking bit is not set, the real MAC address will be copied from primary storage device 235 into MAC 232.

The current setting of the cloak bit 215 is detected during POST. When cloak bit 215 is set, the address stored in primary storage device 235 is copied into backup storage device 260. The address in primary storage device 235 is then modified by scrambling the address, zeroing-out the address, or storing a new address which is one of a range of dummy addresses or a single standard anonymous MAC address provided by the IEEE. Client 104 must then be reset in order to cause the loading of the anonymous MAC address into the MAC when the hardware is initialized.

Thereafter, when the address is loaded into MAC 232, the anonymous MAC address will be loaded. The anonymous MAC address is used until the cloak bit is cleared. When the cloak bit is detected during POST as being cleared after just previously being set, the address stored in backup storage device 260, i.e. the real MAC address assigned to network adapter 230, will be copied into primary storage device 235. Client 104 must then be reset in order to cause the loading of the real MAC address into the MAC when the hardware is initialized. Thereafter, when the address is loaded into MAC 232, the real MAC address will be loaded. The real MAC address is used until the cloak bit is set.

Network adapter 230 may be plugged into one of the PCI connector slots 210 (as illustrated) or one of the ISA connector slots 216 in order to permit client 104 to communicate with server 100 utilizing a communication link 106. MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with the address of MAC 232, and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236. Physical layer 234 is also responsible for wave shaping and provides analog voltages. In a preferred embodiment, physical layer 234 is implemented utilizing an Integrated Services chip ICS-1890.

Physical layer 234 includes auto-negotiation logic that serves three primary purposes. First, it determines the capabilities of client 104. Second, it advertises its own capabilities to server 100. And, third, it establishes a connection with server 100 using the highest performance connection technology.

Figure 3:
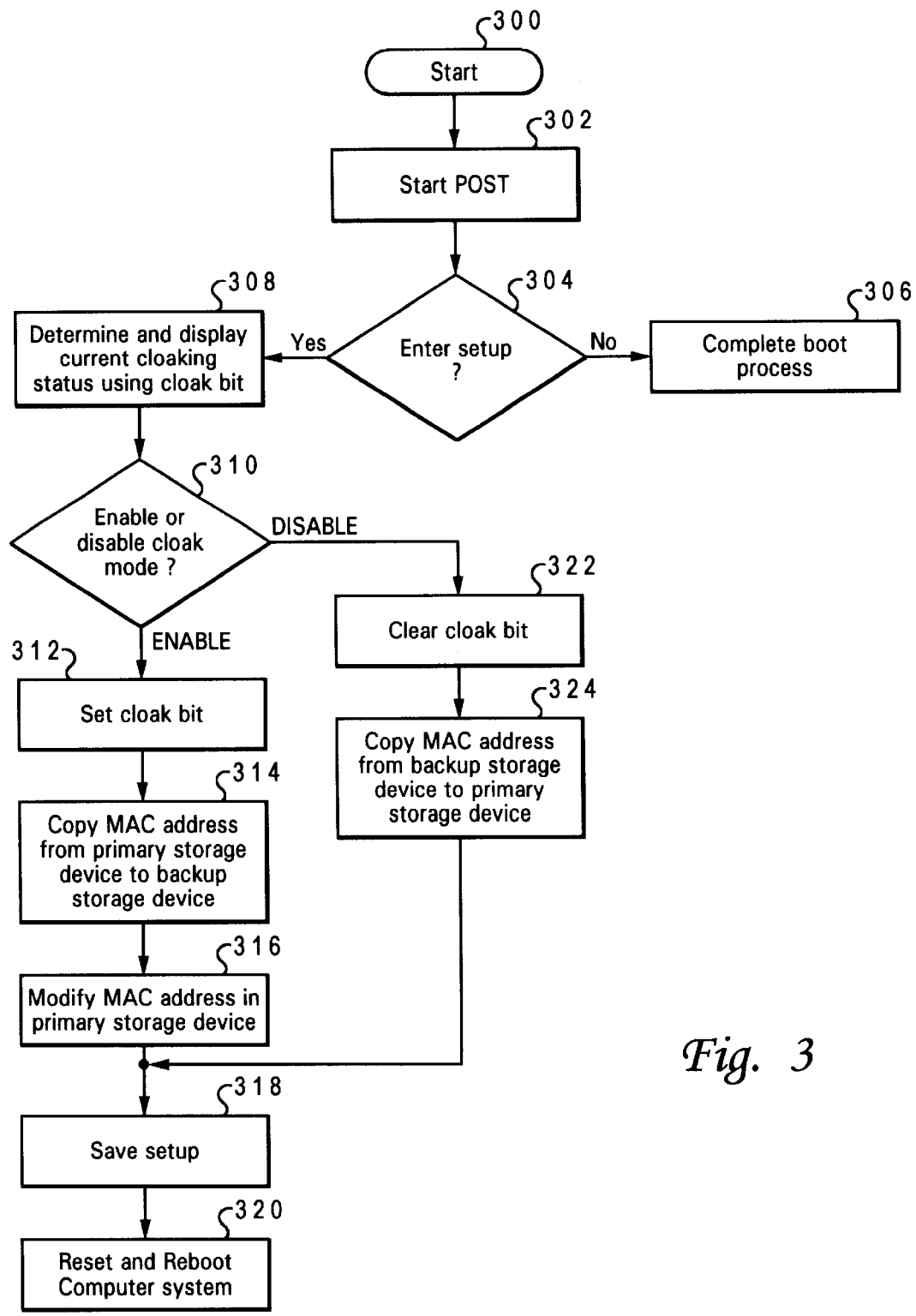
FIG. 3 illustrates a high level flow chart which depicts storing an anonymous MAC address in a primary storage device and copying a real MAC address to a backup storage device for recovery purposes in accordance with the method and system of the present invention.

FIG. 3 a high level flow chart which depicts storing an anonymous MAC address in a primary storage device and copying a real MAC address into a backup storage device for recovery purposes in accordance with the method and system of the present invention. The process starts as depicted at block 300 and thereafter passes to block 302 which illustrates starting the execution of POST. Next, block 304 depicts a determination of whether or not a user has entered SETUP. If a determination is made that the user has not entered SETUP, the process passes to block 306 which illustrates completing the boot process to boot the computer system.

Referring again to block 304, if a determination is made that the user has entered SETUP, the process passes to block 308 which depicts a determination and displaying of a current cloaking status for the computer system using cloak bit 215. Next, block 310 illustrates a determination of whether to enable or disable cloaking. If a determination is made to enable cloaking, the process passes to block 312 which depicts setting cloak bit 215. The process then passes to block 314 which illustrates copying the address currently stored in primary storage device 235 to backup storage device 260. Thereafter, block 316 depicts modifying the address currently stored in primary storage device 235. Next, block 318 illustrates saving SETUP. Block 320, then, depicts resetting and rebooting the computer system.

Referring again to block 310, if a determination is made to disable cloaking, the process passes to block 322 which illustrates clearing cloak bit 215. Thereafter, block 324 illustrates copying the address currently stored in backup storage device 260 to primary storage device 235. The process then passes to block 318.

Figure 4:
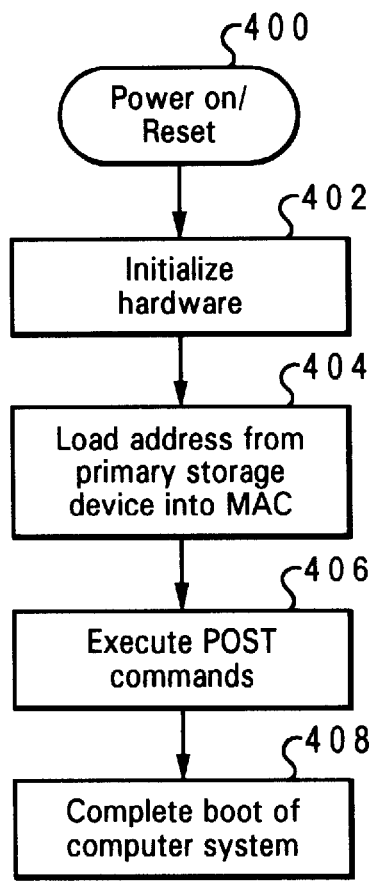
FIG. 4 depicts a high level flow chart which illustrates the initialization of a client computer system's hardware including loading an address stored in a primary storage device into a MAC prior to the client executing a boot process in accordance with the method and system of the present invention.

FIG. 4 depicts a high level flow chart which illustrates the initialization of a client computer system's hardware including loading an address stored in a primary storage device into a MAC prior to the client executing a boot process in accordance with the method and system of the present invention. The process starts as depicted at block 400 when the client is reset or power is cycled off and then back on, and thereafter passes to block 402 which illustrates initializing the hardware in client computer system 104. Next, block 404 depicts the address currently stored in primary storage device 235 being copied into MAC 232. Thereafter, block 406 illustrates client 104 executing POST commands. Block 408, then, depicts a completion of the boot process for client computer system 104.

Figure 5:
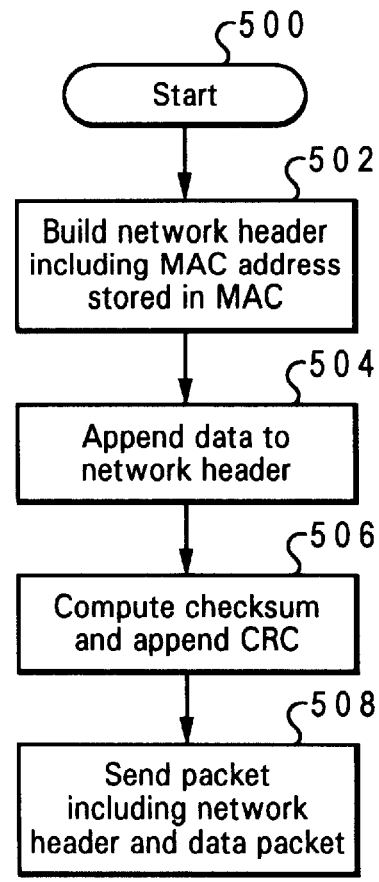
FIG. 5 illustrates a high level flow chart which depicts a client computer system building and transmitting a network packet which includes either a real or an anonymous MAC address in accordance with the method and system of the present invention.

FIG. 5 illustrates a high level flow chart which depicts a client computer system building and transmitting a network packet which includes either a real or an anonymous MAC address in accordance with the method and system of the present invention. The process starts as illustrated at block 500 and thereafter passes to block 502 which depicts building a network header. A network header includes a MAC header, an IP header, an Authentication header, and a UPD header. The MAC header includes the MAC address for the destination for this packet, and the MAC address for the computer which acted as the source of this packet. The MAC address for the source computer system is copied from the MAC for the source computer system. When the computer system is disguising its real MAC address, the address copied out of the MAC will be the anonymous address. When the computer system is not disguising its real MAC address, the address copied out of the MAC will be the real address assigned to this network adapter.

The process then passes to block 504 which illustrates appending data to the header to create a network packet. Next, block 506 depicts computing a checksum and adding the CRC to the network packet. Thereafter, block 508 illustrates transmitting the packet which includes the header and the data.

While a preferred embodiment has been particularly shown and described, it will be understood by those skilled in the art that various changes in form and detail may be made therein without departing from the spirit and scope of the present invention.

What is claimed is:

1. A method for substituting an anonymous media access controller (MAC) address for a client computer system's real MAC address in order to disguise an identity of said client computer system when said client computer system is utilizing a network, said client computer system being coupled to a server computer system via said network, said method comprising the steps of:

establishing a primary storage device for storing a MAC address, wherein a MAC address stored in said primary storage device is utilized as a network address for said client computer system when said client computer system is utilizing said network;

generating said anonymous MAC address, wherein said anonymous MAC address is not associated with any particular client computer system;

storing said anonymous MAC address in said primary storage device; and said client computer system utilizing said anonymous MAC address as said network address for said client computer system when said client computer system is utilizing said network.

2. The method according to claim 1, further comprising the steps of:

establishing a backup storage device for saving said real MAC address while said anonymous MAC address is being utilized as said network address; and moving said real MAC address from said primary storage device to said backup storage device, wherein said real MAC address is not located in said primary storage device after said move.

3. The method according to claim 1, further comprising the steps of:

initializing said client computer system hardware prior to said client computer system executing a boot process;

copying an address stored in said primary storage device to a media access controller included within said client computer system during said initialization of said hardware; and utilizing said address stored in said media access controller as said network address of said client computer system.

4. The method according to claim 3, further comprising the step of executing said boot process after said step of copying said address stored in said primary storage device to said media access controller.

5. The method according to claim 1, further comprising the steps of:

establishing a cloak bit for specifying whether to disguise said identity of said client computer system said client computer system starting execution of said boot process;

determining whether said cloak bit is set during'said are execution of said boot process; and in response to a determination that said cloak bit is set, moving said real MAC address stored in said primary storage device to a backup storage device and storing said anonymous MAC address in said primary storage device, wherein said identity of said client computer system is disguised by utilizing said anonymous MAC address when utilizing said network.

6. The method according to claim 5, further comprising the step of in response to a determination that said cloak bit is cleared, moving said real MAC address from said backup storage device to said primary storage device, wherein a true identity of said client computer system is represented when said client computer system is utilizing said network by utilizing said real MAC address.

7. The method according to claim 5, further comprising the step of after said step of moving said real MAC address to said backup storage device, rebooting said client computer system.

8. The method according to claim 1, further comprising the step of transmitting said anonymous MAC address in each network packet transmitted by said client computer system utilizing said network as said network address for said client computer system.

9. A system for substituting an anonymous media access controller (MAC) address for a client computer system's real MAC address in order to disguise an identity of said client computer system when said client computer system is utilizing a network, said client computer system being coupled to a server computer system via said network, comprising:

a primary storage device for storing a MAC address, wherein a MAC address stored in said primary storage device is utilized as a network address for said client computer system when said client computer system is utilizing said network;

means for generating said anonymous MAC address, wherein said anonymous MAC address is not associated with any particular client computer system;

said primary storage device for storing said anonymous MAC address; and said client computer system for utilizing said anonymous MAC address as said network address for said client computer system when said client computer system is utilizing said network.

10. The system according to claim 9, further comprising:

a backup storage device for saving said real MAC address while said anonymous MAC address is being utilized as said network address; and means for moving said real MAC address from said primary storage device to said backup storage device, wherein said real MAC address is not located in said primary storage device after said move.

11. The system according to claim 9, further comprising:

said client computer system hardware being initialized prior to said client computer system executing a boot process;

means for copying an address stored in said primary storage device to a media access controller included within said client computer system during said initialization of said hardware; and means for utilizing said address stored in said media access controller as said network address of said client computer system.

12. The system according to claim 11, further comprising means for executing said boot process after said step of copying said address stored in said primary storage device to said media access controller.

13. The system according to claim 9, further comprising:

a cloak bit for specifying whether to disguise said identity of said client computer system said client computer system for starting execution of said boot process;

means for determining whether said cloak bit is set during said execution of said boot process; and means in response to a determination that said cloak bit is set, for moving said real MAC address stored in said primary storage device to a backup storage device and storing said anonymous MAC address in said primary storage device, wherein said identity of said client computer system is disguised by utilizing said anonymous MAC address when utilizing said network.

14. The system according to claim 13, further comprising means in response to a determination that said cloak bit is cleared, for moving said real MAC address from said backup storage device to said primary storage device, wherein a true identity of said client computer system is represented when said client computer system is utilizing said network by utilizing said real MAC address.

15. The system according to claim 13, further comprising means after said step of moving said real MAC address to said backup storage device, for rebooting said client computer system.

16. The system according to claim 9, further comprising means for transmitting said anonymous MAC address in each network packet transmitted by said client computer system utilizing said network as said network address for said client computer system.

* * * * *